ced. Other collecting devices such as insect traps may be
United States Patent
[19]

Gale

[11] 3,900,982

[45] Aug. 26, 1975

[54] QUICK OPENING BUCKET

[76] Inventor: William F. Gale, River Rd., Wapwallopen, Pa. 18660

[22] Filed: June 20, 1974

[21] Appl. No.: 481,360

[52] U.S. Cl. .................................................. 43/7
[51] Int. Cl.² .......................................... A01K 75/00
[58] Field of Search .............. 43/9, 6.5, 7, 100, 103

[56] References Cited
UNITED STATES PATENTS

| | | | |
|---|---|---|---|
| 2,720,047 | 10/1955 | Isaacs | 43/7 |
| 3,035,365 | 5/1962 | Luketa | 43/9 |

*Primary Examiner*—Louis G. Mancene
*Assistant Examiner*—Daniel J. Leach

[57] ABSTRACT

A device for use in collecting small aquatic organisms such as plankton, larval fish, etc., and for use in collecting insects. It comprises a funnel shaped net having a large and a reduced end, a shape retaining, open-ended, tubular bucket holder having one end fitted within the reduced end of the net, and its other end extending outwardly from the net, a clamp securing the reduced end of the net to the one end of the bucket holder, and a tubular bucket having a closed bottom end and an open end, the open end of the bucket being telescoped with respect to the outwardly extending end of the bucket holder and frictionally retained thereto. A safety chain is optionally provided to prevent complete separation of the bucket from the bucket holder in the event the bucket and bucket holder should become inadvertently disconnected. Other collecting devices such as insect traps may be connected to the one end of the bucket holder in lieu of the net.

9 Claims, 5 Drawing Figures

QUICK OPENING BUCKET

This invention relates to a quick opening bucket for attachment to nets used in collecting small aquatic organisms such as plankton, larval fish, etc., to traps for collecting insects, and to other collecting devices for collecting small organisms from a surrounding environment.

BACKGROUND OF THE INVENTION

There are commercially available funnel shaped nets of various sizes and mesh that are towed behind a boat, pulled through the water by hand, held in place in running water (streams and rivers), or held in place and water pumped into the net. Such nets are often used to collect small aquatic organisms such as drifting invertebrates, larval fish, zooplankton etc. Collecting buckets are attached to the reduced end of the net for retaining the organisms collected in the net until such time as the net and bucket are withdrawn from the water and the bucket is emptied of its sample. Several types of plankton buckets are available commercially, none of which are easily emptied. One type of bucket has a valve in the bottom. Unfortunately the valve aperture is much too small and may be clogged by small pieces of detritus. Buckets with clogged valves may need to be disassembled to obtain the sample. A second type of bucket is hose clamped to a net and must be removed to pour the sample out of the top. Removal and replacement of the bucket is at best inconvenient and in rough seas with fingers numbed by low temperatures may require several minutes' work.

SUMMARY OF THE INVENTION

The present invention provides a quick opening collecting bucket which is easily removed from a collecting net for emptying and which is easily replaced in position with respect to the net for collecting small aquatic organisms. The invention includes an open-ended, shape retaining tubular bucket holder having one end fitted within the reduced end of a collecting net and its other end projecting outwardly from the net, means securing the reduced end of the net to the one end of the bucket holder; and a tubular bucket having a closed bottom end and an open end, the open end of the bucket telescopes onto the outwardly extending end of the bucket holder and locks in place by a twist. The bucket is opened by simultaneously twisting and pulling the bucket away from the holder. Although the bucket is held to the holder by friction, it does not come apart during use because the frictional force holding the two parts together exceeds the force exerted on the bucket by the water. The sample collected in the bucket is poured from the open top of the bucket into a collection jar. The bottom of the bucket is concave on its inside to facilitate rinsing out sediments, and is flat on the outside so the bucket can be set down in vertical position.

A screened aperture is provided in the tubular wall of the bucket between the top and bottom thereof to permit water to flow out the aperture while the screen retains the aquatic organisms within the bottom. The position of the screened aperture, as well as mesh size is optional but the farther the aperture is from the bottom the greater will be the volume of the sample. Only one side of the bucket is screened so the sample can be poured from the other. The screen may be brass, bronze, monofilament nylon or other material and is preferably fastened to the bucket with an adhesive such as acrylic glue.

The bucket is preferably made from a length of rigid walled plastic tubing such as ABS plastic, tapered on the inside at its open end, and the holder is made of similar material but tapered on the outside adjacent its outwardly extending end. The ABS plastic materials are corrosion proof and can be used in salt water.

With the foregoing more important objects and features in view and such other objects and features which may become apparent as this specification proceeds, the invention will be understood from the following description taken in conjunction with the accompanying drawings, in which like characters of reference are used to designate like parts, and in which.

Figure 1:
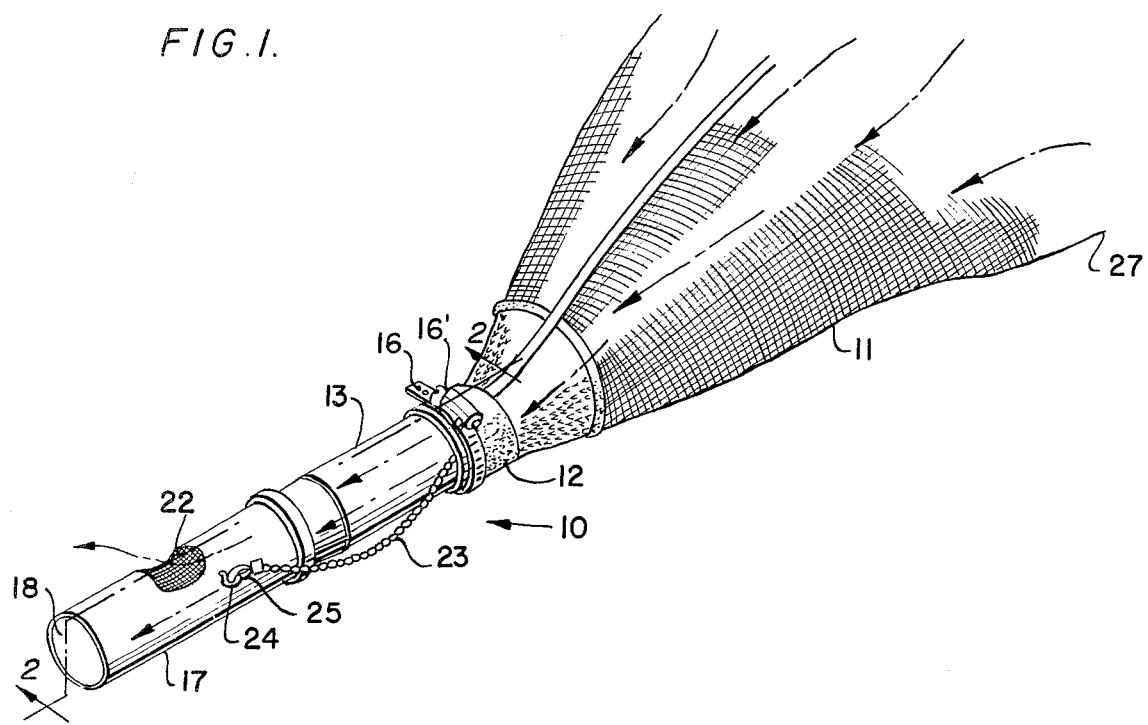
FIG. 1 is a perspective view of the invention.
Figure 2:
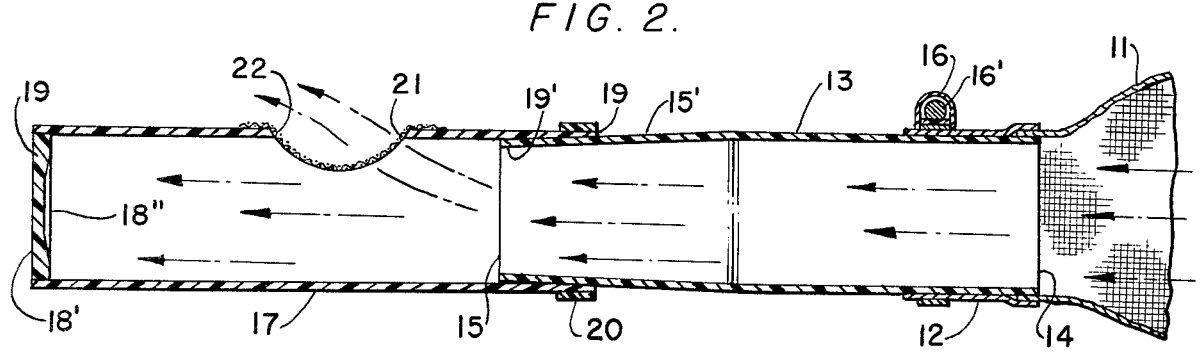
FIG. 2 is a vertical longitudinal cross sectional view taken on line 2-2 of FIG. 1.

Referring now to the drawings and particularly to FIG. 1, the invention is designated generally by the reference numeral 10. It includes a funnel shaped aquatic organism collecting net 11 having a large open end 27 and a reduced open end 12. An open-ended tubular bucket holder 13 has one end 14 fitted within the reduced end 12 of the net and its other end 15 extending outwardly from the net. A hose clamp 16 encompasses the reduced end of the net and firmly secures the net to the bucket holder 13. The hose clamp 16 may be tightened or loosened in a conventional manner by means of a screw 16'. A tubular bucket 17 having a closed bottom end 18 and an open top end 19 is adapted to be quickly secured to the bucket holder 13 by slipping the open end 19 over the outwardly extending end 15 until firmly seated thereon and then twisting the bucket relative to the bucket holder while forcing the two together until a tight friction fit is obtained. Conversely the bucket 17 may be quickly removed from the bucket holder 13 by oppositely twisting the bucket holder and bucket while simultaneously pulling the two in opposite directions (see FIG. 3). The main tubular body portions of the bucket 17 and bucket holder 13 are cylindrical; however, the inside surface of the bucket open end portion 19' has an inwardly converging conical taper while the outside surface of the bucket end portion 15' has an outwardly converging conical taper as best seen in FIG. 4. The tapered surfaces 15' and 19' form mating seats which limit the extent of axial movement of the bucket holder within the bucket 17.

The bucket 17 has an aperture 21 positioned in its tubular wall between its bottom 18 and open end 19. The aperture is covered with a fine mesh screen 22 which permits water to flow from the bucket but retains the desired aquatic organism within the bucket. The screen 22 is preferably adhesively secured to the bucket 17 by a suitable adhesive applied to the surface of the bucket surrounding the aperture. The outside surface 18' of the bucket bottom 18 is flat so that the bucket may be set down on a table in its vertical position as seen in FIG. 4. The inside surface 18'' of the bucket bottom is concave to facilitate rinsing sediment from the bottom of the bucket. A concentric cylindrical ring 20 is adhesively fastened about the bucket at its open end 19 in order to provide a hand hold and to reinforce the open end. Similarly a concentric ring may be fastened about the bucket holder 13 at its end 14 for reinforcement. The rings are about one-half inch wide and are fastened to each component with methylene dichloride or other adhesive.

A safety chain 23 is optionally provided to prevent complete separation of the bucket 17 from the bucket holder 13 in case sufficient force is applied against the bucket to loosen the friction fit between the bucket and bucket holder while in use. One end of the chain is secured to the bucket holder under the clamp 16 while the other end of the chain is provided with a snap fastener 25 which is snapped in place over an eye bolt 24 fastened to the bucket 17 as seen in FIG. 1. The chain will normally be of sufficient length so that it will have slack when the bucket 17 is tightly fitted on the bucket holder 13.

OPERATION OF THE INVENTION

For use the invention, assembled as shown in FIG. 1, is placed in a body of water so that water and aquatic organisms enter the large end 27 of the net 11 and move toward the reduced end 12. Some of the water will flow out through the net, while a portion of the water entering the net will carry any organisms collected by the net into the bucket 17 through the bucket holder 13. The organisms will be retained within the bucket 17 while water passes out through the aperture 21 and screen 22.

Figure 3:
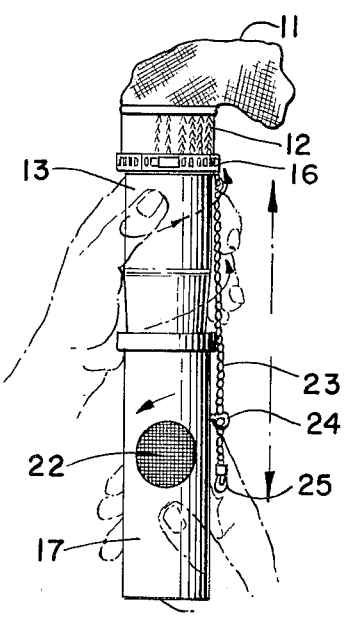
FIG. 3 is a vertical elevational view of the invention illustrating the manner of separating the collecting bucket from the bucket holder.
Figure 4:
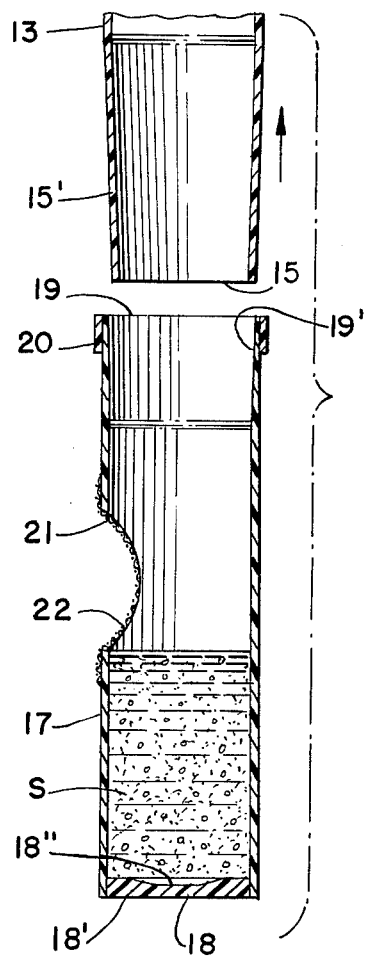
FIG. 4 is a vertical longitudinal cross sectional view showing the collecting bucket separated from the bucket holder with a sample in the bucket.
Figure 5:
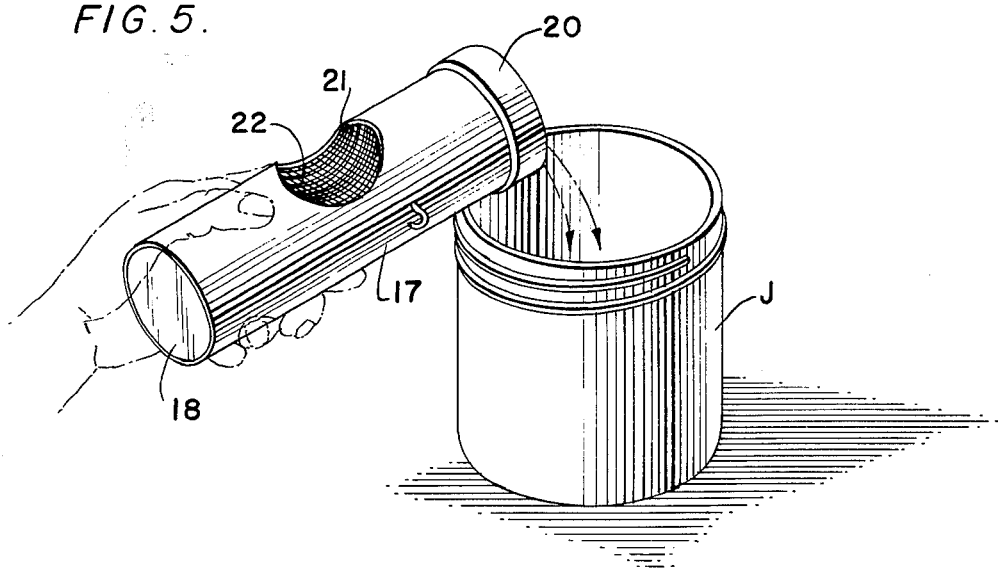
FIG. 5 is a perspective view illustrating the manner of emptying the sample from the collecting bucket into a jar.

When it is desired to remove the sample S from the bucket 17, the net 11 and attached bucket are lifted from the water until the bucket and bucket holder can be grasped by both hands of an operator as shown in FIG. 3. The bucket and bucket holder are twisted in opposite directions and pulled apart until they become separated. The safety chain is unsnapped from the eye bolt 24 and the bucket is emptied of its contents into a jar J in the manner illustrated in FIG. 5.

While the bucket and holder of this invention have been described particularly in association with a net for collecting aquatic organisms, they may be used without the net as the collection chamber for light traps which collect flying insects at night.

The lengths of the bucket and bucket holder are optional depending on their specific use and how much detritus is expected in the sample. By way of example only, the length of the bucket should be from 8 to 14 inches. The longer bucket provides much more room but is more cumbersome to handle. The bucket holder should be about 6 inches long to provide space for grasping when the net and bucket are in place.

While in the foregoing there has been described and shown a preferred embodiment of the invention, various modifications and equivalents may be resorted to within the spirit and scope of the invention is claimed.

1. A quick opening device for collecting small aquatic organisms comprising a funnel shaped net having a large end and a reduced end, a shape retaining tubular bucket holder having open ends, one end of said bucket holder being fitted within the reduced end of said net with the other end extending outwardly from said net, means clamping the reduced end of said net to the one end of said bucket holder, a collecting bucket having a tubular body, a closed bottom end and an open and opposite said bottom end, said open end of said bucket being separately and frictionally connected with respect to the outwardly extending end of said bucket holder, whereby the bucket may be readily removed from bucket holder by twisting and pulling apart longitudinally.

2. The device according to claim 1 wherein said tubular wall of said bucket has an aperture therein, and a screen covering the aperture for passing water therethrough while retaining aquatic organisms within the bucket.

3. The device according to claim 1 wherein said bottom end has a flat external surface.

4. The device according to claim 1 wherein the inside surface of said bottom is concave.

5. The device according to claim 1 wherein the exterior surface of said outwardly extending end of said bucket holder and the interior surface of the open end of said bucket have complementary tapers which limit the extent to which the outwardly extending end of said bucket holder telescopes within the open end of said bucket.

6. The device according to claim 1 together with a safety chain having one end connected to said bucket holder and its other end connected to said bucket to prevent complete separation of said bucket from said bucket holder.

7. The device according to claim 6 wherein said bucket has an eye fitting mounted on said tubular body and said chain has a snap hook on said other end for quickly attaching and detaching said chain to said eye bolt.

8. A quick opening device for use in collecting samples of insects, small aquatic organisms and the like and adapted to be used in association with means for directing the samples into the device, the improvement comprising a shape retaining tubular bucket holder having open ends, one end of the bucket holder being adapted for connection to means for directing a sample into the bucket through the bucket holder and a tubular collecting bucket having a closed bottom end and an open end opposite said bottom end, said open end of said bucket and the other end of said bucket holder having mating surfaces adapted to telescope relative to each other between a fully seated position and a fully separated position, said mating surfaces when fully seated providing a friction fit joint for holding said bucket and bucket holder, together, and permitting ready removal and separation of the bucket from the bucket holder.

9. The device set forth in claim 8 wherein said mating surfaces are tapered.

* * * * *